Patented Dec. 25, 1951

2,579,781

UNITED STATES PATENT OFFICE 2,579,781

MAGNESIA REFRACTORY AND METHOD OF MAKING

Leslie W. Austin, San Jose, and James C. Hicks, Menlo Park, Calif., assignors to Kaiser Aluminum & Chemical Corporation, a corporation of Delaware No Drawing. Application June 17, 1949, Serial No. 99,886

13 Claims. (Cl. 106—58)

This invention relates to dense, non-porous crystalline magnesia, and to methods of making the same.

Many investigations have been made in methods of firing magnesia, or magnesium compounds which will yield magnesia upon heating, and in methods of making refractory articles therefrom. Magnesium oxide has a very high melting point and has been recognized as a desirable material to be employed in installations where ability to withstand heat is required. It has generally been considered, however, that, in order to bond magnesia particles together into a formed shape, it has been necessary to add fluxing agents or bonding materials which themselves provide or form substances which melt at lower temperatures than the magnesia. In this way, the tendency of the formed shape to slip and deform or fail under load at high temperatures is a function, not of the fusing point of the magnesia, but of that of the lower-melting components of the structure. Also, magnesia shaped refractories have a tendency to spall. Furthermore, it is difficult, when operating with higher purity magnesia refractories, to obtain dense, non-porous crystal agglomerates. For use in many high temperature installations, where there are employed towers packed with heat exchange materials, for example, it is desirable that the magnesia aggregates be as dense and non-porous as possible. This is desired in order to prevent entry of foreign substances, gaseous or solid, into the pores of the agglomerates which may have a reducing action at the high temperatures attained in operation, effecting reduction of the magnesium oxide with consequent deformation, spalling or failure of the shape structure. It is also desirable that these structures or agglomerates be dense and non-porous in order to assure high heat capacity and maximum heat conductivity. It is further desired that the agglomerates exhibit little linear shrinkage, in order to avoid development of cracks or other deformation in use.

It has been known to fuse magnesia in order to obtain periclase of high density, but such fused material is so inactive that it does not bond well when the operator attempts to re-form it into shapes of desired size and conformation. The bonding into shapes of high purity periclase crystals which have not been obtained by fusion also ordinarily produces materials which still have appreciable porosity, although exhibiting excellent hot-load strengths and greatly improved spalling characteristics.

According to the present invention it has now been found that dense, non-fused agglomerates of magnesia crystals, having very low porosity and containing at least 95% of magnesium oxide are obtained by admixing 50% to 95% by weight of finely ground periclase, or magnesia, containing at least 95% of magnesium oxide and not over 2.0% $SiO_2$ and not over 2.0% CaO and which has been heated to an inactive or a deadburned condition, or to fusion, and from 50% to 5% of finely ground active, or caustic, magnesia of the same purity, pressing into shape, and firing to at least 1650° C. but without fusing. An especially suitable starting material is a high purity well-crystallized magnesia as described which has been fired at a temperature of at least 2000° C. Mixtures of such crystallized magnesias can be employed as aggregate material.

The magnesia aggregate is finely ground, until substantially all passes through a Bureau of Standards screen having 200 meshes per linear inch. By employing the crystallized material in particle sizes less than 200 mesh (74 microns), it is found that the periclase and magnesia can be packed together so well, preferably under pressures of at least 4000 pounds per square inch that, when fired, recrystallization of the active magnesia of the bond in conjunction with the large surface area available of the highly purified periclase produces a final periclase refractory shape of greater density and lower porosity than hitherto obtainable with such starting materials. In the material passing 200 mesh, preferably a major proportion, or over 50%, is less than 10 microns in diameter. It is believed that the good results are obtained because the periclase aggregate of this invention, while it is highly crystallized, has in these small-sized particles a considerable surface available for the bonding action of the more active magnesia employed as binder, or that the high-purity particles when ground to the size noted are fairly equidimensional and pack well, or both, and that the surfaces, being free of impurities, are susceptible of recrystallizing actions in contrast to periclase made with fluxing agents which in previous practice have provided a masking film on the surfaces of the individual periclase crystals.

The active, or caustic, bonding magnesia contains at least 95% of magnesium oxide and not over 2.0% of silica and not over 2.0% of CaO. It is crypto-crystalline and is obtained, for example, by heating a magnesium compound, which yields magnesia upon heating, to decompose the compound but under conditions which provide a magnesia having a maximum bulk density of less than 1.5 gms. per c.c. as measured on a sample passing 200-mesh and compacted under its own weight, as by jarring or vibrating the base of the container therefor. For example, in practice it is suitable to calcine magnesium hydroxide or a magnesium carbonate for from 15 to 45 minutes at not over 1200° C. to obtain magnesia of the desired activity. The bonding magnesia is ground or comminuted until substantially all passes through a 200-mesh screen, and a substantial proportion passes 325-mesh. Preferably, at least about 75% of this magnesia passes through the 325-mesh screen.

The magnesia aggregate and the bonding magnesia are intimately mixed together, and are preferably mixed by milling together, as in a ball mill, for example. The mixed material is pressed, and is ready for firing. Where it is desired to make a shaped product, as for use in a particular installation, the mixture is formed into the shape under pressure, and preferably a pressure of at least 4000 pounds per square inch is applied. It is found that this increases density, insures good inter-crystallization between bond and aggregate during firing, and reduces the tendency to form laminations under high temperatures.

Water is preferably added in tempering amounts, for example, from 3% to 15% by weight of the total mix, during blending, but in some instances it is satisfactory to press dry.

It is an advantage of the process of this invention that very dense shapes of low porosity are obtained upon firing and it is a further advantage that the shapes do not shrink much during firing. This is in contrast to the prior art, where it was the practice to employ aggregate comprising several different grain sizes in order to minimize shrinkage during firing while at the same time to obtain a refractory shape of as densely packed mass as possible, on the theory that the larger grains maintained the structural shape while the smaller particles filled the interstices therebetween.

As an example of the method of carrying out this invention, periclase which contains 98.05% magnesium oxide, 1.12% silica, 0.11% CaO, 0.29% $Fe_2O_3$, and which has been heated at about 2000° to 2200° C. for at least about a week, is ground to substantially all pass 200 mesh. In batch A, 85% by weight of this ground periclase is intimately admixed with 15% by weight of active magnesia, also ground to pass 200 mesh, and containing over 95.0% magnesium oxide, less than 2.0% silica and less than 2.0% CaO, and the mixture of magnesias is blended with the addition of 8% of its weight water. The mixture is pressed into shape under a pressure of 11,000 pounds per square inch, and the shape is fired for one-half hour at a temperature exceeding 2000° C. and attaining during that period a maximum of 2100° C. The shape after so firing is found to have shrunk only about 10%, on a linear basis, and exhibits an apparent porosity of 10.7%. In contrast to this, batch B is prepared containing 55% of the same highly crystallized periclase, as described in Batch A, passing 20 mesh and retained on 40 mesh, 30% of such periclase passing 200 mesh, and 15% of active magnesia as described in batch A, and the whole is blended with 5% of its weight of water (less being required to obtain suitable plasticity in the mass). The blended batch is pressed and fired as in batch A. The resulting shape has undergone very little shrinkage, but it exhibits a porosity of 27.8%.

The following table demonstrates the improved porosity and the simultaneous improvement in shrinkage characteristics obtained when working according to the present invention. Test Nos. 1 to 3 were prepared as described for batch A above, with the high-purity starting magnesia differing as shown. The periclase of test No. 4 was prepared by firing precipitated magnesium hydroxide in a stack kiln to form well-crystallized periclase. It was then ground to pass 200 mesh, mixed with 8% water, pressed at 10,000 lbs. per sq. in. pressure, and fired at 2000° C. for one-half hour.

In test No. 5, the mix was prepared by blending 84 parts by weight of the periclase, as employed in test No. 2, with, as bonding material, 16 parts by weight of "hard burn" magnesia, which is magnesia fired to a temperature of more than 1300° C. and having a bulk density of about 1.7 gms. per c.c., measured as previously described, and 8 parts by weight of water to temper the mix, all of the magnesia ingredients passing 200 mesh, pressing into shapes under 11,000 lbs. per sq. in. pressure, and firing as in batch A above. In test No. 6, the mix was prepared by blending all moderately active magnesia, used as bond in the other tests herein, substantially all passing 200 mesh, with 15% water (required to give suitable plasticity to the mix), and pressing and firing as described for the other batches. Tests Nos. 7 and 8 were prepared in the same way as test No. 2 and using the same ingredients, but varying the amounts of bonding magnesia and highly-crystallized aggregate, as shown and employing slightly differing tempering amount of water. In all of these tests the bond and the periclase or magnesia aggregate total 100% of dry ingredients, that is, for example, where 95% of periclase is shown, 5% of bond is added, and the indicated per cent of water, based on the total weight of dry ingredients, is added to blend. All of the starting magnesias contained at least 95.0% magnesium oxide, less than 2.0% silica and less than 2.0% CaO; and all solid constituents of these mixes were of particle sizes passing 200 mesh.

The fired shapes obtained with the active magnesia (test No. 6) exhibit very low apparent porosity but also undergo excessive shrinkage in firing, with the production of many deep cracks in the structure, and also exhibit laminations which, upon firing for long periods at high temperatures, result in failures due to break-down of the piece. As shown in the above tests and in the previous example, the employment of high-purity, highly crystallized periclase starting material, of the fine particle size shown, results in formed shapes of not over about 12.0% porosity and in satisfactorily low shrinkage, whereas active, or caustic, magnesia, or highly crystallized magnesia in larger particle size, does not result in such low porosity with simultaneous satisfactory shrinkage, when mixed and fired as shown.

In a comparative test, another mix is prepared and fired in the same manner as test No. 2, above, with the exceptions that the periclase aggregate is ground to pass 100 mesh but with a substantial portion larger than 200 mesh, and that 25% of bonding magnesia is employed. The fired shape obtained in this manner exhibits a porosity of 22.3%, or over twice as much as the product obtained with the highly crystallized material ground to substantially all pass 200 mesh.

Table

| Test No. | Magnesia Aggregate | Bond | Water Added | Apparent Porosity of Fired Shape | Linear Shrinkage |
|---|---|---|---|---|---|
| | | | Per Cent | Per Cent | |
| 1 | Periclase fired at 2200° C., for several weeks. | 15% active magnesia. | 8 | 10.7 | About 10%. |
| 2 | Periclase fired to at least 1600° C. for at least 1 hr. | ----do------ | 8 | 11.0 | Do. |
| 3 | Elec. fused magnesia | ----do------ | 8 | 10.3 | Do. |
| 4 | Periclase, fired in stack kiln. | None | 8 | 16.0 | Do. |
| 5 | Periclase fired to at least 1600° C. for at least 1 hr. | 16% "Hardburn" magnesia. | 8 | 15.7 | Do. |
| 6 | All active magnesia | None | 15 | 2.1 | About 20%, with many fissures and cracks. |
| 7 | Periclase fired to at least 1600° C. for at least 1 hr. | 35% active magnesia. | 10 | 11.2 | About 10%. |
| 8 | ----do------ | 5% active magnesia. | 8 | 10.6 | Do. |

The active magnesia can be employed as binder, for the highly crystallized aggregate, in amounts of from 5% to 50% of the mixture, the lower amounts being more useful where the binder is of higher activity. Preferably from about 10% to 20% of the active magnesia bond is added. If desired to impart higher cold strength, or higher strength during the intermediate firing range, there can also be added other binding agents such as magnesium sulfate, cellulose derivatives and the like which either break down to form periclase or are driven off, upon firing, but it is preferred, in general, to temper with water as described above.

The pressed shapes can be installed, and fired, in some cases, in the place of use, or, if desired, can be fired before installation. The pressed shapes are fired at a temperature of at least 1650° C. Preferably they are fired at a temperature of at least 1900° C. for at least one-half hour. Due to their low apparent porosity, or high density, and low shrinkage upon firing, they are particularly useful as heat exchange media. The fired products can be comminuted, however, and employed as aggregate or grain in making other refractories or other products; or they can be employed per se in many refractory applications. The process is of special advantage in the preparation of heat-exchange agglomerates, and products of like smaller sizes.

The apparent porosity is expressed in percent by volume and is determined by mercury displacement. Percentages in the specification and claims are expressed as percent by weight, except for porosity, which is by volume. In conformity with common practice in reporting chemical analyses of refractory materials, in this specification and claims the amounts of the various chemical constituents present in the material are given as though these constituents were present as the simple oxides. Thus, the magnesium constituent is referred to as magnesium oxide or MgO, the silicon content as silica, silicon dioxide or $SiO_2$, and so on for the other elements reported, although the silica, lime or other elements or oxide may be present in combination with a very small proportion of the MgO, or with each other. That is to say, the term "2.0% of $SiO_2$" (or "of silicon expressed or calculated as $SiO_2$") is intended to mean that a chemical analysis of the material referred to would show the silicon content as $SiO_2$, whereas in reality all of the silicon might be present in the form of forsterite or in some other combined form.

Having now described the invention, what is claimed is:

1. Method of making a dense, crystalline, magnesia product which comprises admixing from about 50% to about 95% of periclase containing at least 95.0% magnesium oxide and not over 2.0% $SiO_2$ and not over 2.0% CaO and of a particle size substantially entirely passing 200 mesh and which has been fired to an inactive condition, and from about 5% to about 50% of active magnesia containing at least 95.0% magnesium oxide and not over 2.0% $SiO_2$ and not over 2.0% CaO and of a particle size substantially all passing 200 mesh, pressing, and firing at a temperature of at least 1650° C.

2. Method as in claim 1 wherein said periclase has been fired at a temperature of from 2000° C. to 2200° C. for at least about one week.

3. Method as in claim 1 wherein said periclase is periclase which has been fused.

4. Method as in claim 1 wherein said active magnesia is prepared by calcining a substance chosen from the group consisting of magnesium hydroxide and magnesium carbonate at not over about 1200° C. for from 15 to 45 minutes.

5. Method as in claim 1 wherein at least about 75 percent of said active magnesia is of a particle size to pass 325 mesh.

6. Method as in claim 1 wherein over 50 percent of said periclase is less than 10 microns in diameter.

7. Method of making a dense, crystalline, shaped magnesia product which comprises admixing from about 50% to about 95% of well-crystallized periclase containing at least 95.0% magnesium oxide and not over 2.0% $SiO_2$ and not over 2.0% CaO and of a particle size substantially entirely less than 74 microns diameter and which has been fired at a temperature of at least 1600° C. for at least one hour, and from 5% to 50% active magnesia containing at least 95.0% magnesium oxide and not over 2.0% $SiO_2$ and not over 2.0% CaO and of a particle size passing 200 mesh and at least about 75 percent passing 325 mesh, forming into shapes under a pressure of at least 4000 pounds per square inch, and firing to a temperature of at least 1650° C.

8. Method of making a dense, crystalline, shaped magnesia product which comprises admixing from about 50% to about 95% of well-crystallized periclase containing at least 95.0% magnesium oxide and not over 2.0% SiO2 and not over 2.0% CaO and of a particle size substantially entirely passing 200 mesh and over 50 percent being of less than 10 microns diameter and which has been heated at a temperature of at least 1600° C. for at least one hour, and from 5% to 50% cryptocrystalline magnesia containing at least 95.0% magnesium oxide and not over 2.0% SiO2 and not over 2.0% CaO and of a particle size substantially entirely passing 200 mesh and at least about 75 percent passing 325 mesh, and from 3% to 15% water, forming into shapes under a pressure of about 11,000 pounds per square inch pressure, and firing said formed shapes at a temperature of at least 1650° C.

9. Method as in claim 8 wherein said shapes are fired at a temperature of from 2000° C. to 2100° C. for one-half hour.

10. Method as in claim 8 wherein from about 10% to about 20% of said active magnesia is admixed.

11. Method of making a dense, crystalline, shaped magnesia product useful as heat-exchange medium which comprises admixing about 85% of well-crystallized periclase containing at least 95% magnesium oxide and not over 2.0% SiO2 and not over 2.0% CaO and of a particle size susbtantially entirely less than 74 microns and over 50 percent less than 10 microns and which has been fired at a temperature of at least 2000° C., and about 15% of cryptocrystalline magnesia containing at least 95.0% magnesium oxide and not over 2.0% SiO2 and not over 2.0% CaO and of a particle size substantially entirely passing 200 mesh and at least about 75 percent passing 325 mesh, and about 8% of water based on the total weight of dry ingredients, pressing said mixture into shapes under a pressure of about 11,000 pounds per square inch, and firing said shapes at a temperature of from 2000° C. to 2100° C. for one-half hour.

12. Method of making a dense, homogeneous, crystalline magnesia which comprises admixing from about 50% to about 95% periclase containing at least 95.0% magnesium oxide and not over 2.0% SiO2 and not over 2.0% CaO and of a particle size substantially entirely less than 74 microns and which has been fired to an inactive condition, and from 5% to 50% of active magnesia as bonding agent, said active magnesia containing at least 95.0% magnesium oxide and not over 2.0% SiO2 and not over 2.0% CaO and of a particle size passing 200 mesh and at least about 75 percent passing 325 mesh, pressing said admixture under a pressure of at least 4000 pounds per square inch, and firing to a temperature of at least 1650° C.

13. Dense non-fused crystalline agglomerates of magnesia containing at least 95.0% magnesium oxide and not over 2.0% SiO2 and not over 2.0% CaO, formed of a pressed, fired mixture containing from 50 to 95% well-crystallized periclase analyzing at least 95% MgO and not over 2.0% SiO2 and 2.0% CaO of particle size substantially entirely passing 200 mesh, and from 50 to 5% cryptocrystalline magnesia of susbtantially the same purity and particle size.

LESLIE W. AUSTIN.
JAMES C. HICKS.

REFERENCES CITED

The following references are of record in the file of this patent:

UNITED STATES PATENTS

| Number | Name | Date |
| --- | --- | --- |
| 1,444,527 | Scharschu | Feb. 6, 1923 |
| 1,686,876 | O'Hara | Oct. 9, 1928 |

FOREIGN PATENTS

| Number | Country | Date |
| --- | --- | --- |
| 9,917 | Great Britain | 1884 |
| 225,472 | Germany | 1910 |
| 142,721 | Great Gritain | 1920 |
| 211,873 | Great Britain | 1925 |
| 111,083 | Austria | 1928 |
| 794,346 | France | 1935 |
| 447,525 | Great Britain | 1936 |